US007423741B2

(12) United States Patent
Hornauer et al.

(10) Patent No.: US 7,423,741 B2
(45) Date of Patent: Sep. 9, 2008

(54) METHOD FOR VISUALIZING A MARK ON A SPECTACLE LENS

(75) Inventors: Matthias Hornauer, Aalen (DE); Adalbert Hanssen, Koenigsbronn (DE)

(73) Assignee: Carl Zeiss Vision GmbH, Aalen (DE)

( * ) Notice: Subject to any disclaimer, the term of this patent is extended or adjusted under 35 U.S.C. 154(b) by 90 days.

(21) Appl. No.: 11/332,874

(22) Filed: Jan. 13, 2006

(65) Prior Publication Data

US 2006/0192944 A1    Aug. 31, 2006

Related U.S. Application Data

(63) Continuation-in-part of application No. PCT/EP2004/007425, filed on Jul. 7, 2004.

(30) Foreign Application Priority Data

Jul. 17, 2003   (DE)   ................................. 103 33 426

(51) Int. Cl.
*G01B 9/00*        (2006.01)
(52) U.S. Cl. ..................................................... 356/124
(58) Field of Classification Search ....................... None
See application file for complete search history.

(56) References Cited

U.S. PATENT DOCUMENTS 5,469,261 A  * 11/1995 Hellmuth et al. ............ 356/497
5,867,259 A    2/1999 Yanagi et al.
6,671,039 B2 * 12/2003 Yoda et al. .................. 356/127

FOREIGN PATENT DOCUMENTS

EP        1 167 942 A2    1/2002

* cited by examiner

*Primary Examiner*—Michael P Stafira
(74) *Attorney, Agent, or Firm*—Harness, Dickey & Pierce, P.L.C.

(57) ABSTRACT

A method and an apparatus for making visible a mark on a spectacle lens are disclosed. An illumination light beam is directed to the spectacle lens. The illumination light beam runs through the spectacle lens and, after having run through the spectacle lens, is reflected on a reflector configured as a retroreflector, then runs again through the spectacle lens, and is finally fed to a camera as an observation light beam. The reflector is moved. Further, a measurement light beam is directed to said spectacle lens and fed to a sensor for measuring a physical property of the spectacle lens. The measurement light beam is generated by a first light source and the illumination light beam is generated by a second light source. The first and the second light sources are physically distinct units.

40 Claims, 4 Drawing Sheets

METHOD FOR VISUALIZING A MARK ON A SPECTACLE LENS

CROSS-REFERENCES TO RELATED APPLICATIONS

This application is a continuation-in-part of international patent application PCT/EP2004/007425 filed on Jul. 7, 2004 and published in German language, which international patent application claims priority from German patent application DE 103 33 426.2 filed on Jul. 17, 2003.

FIELD OF THE INVENTION

The present invention is related to the field of manufacturing spectacle lenses.

More specifically, the invention is related to a method for making visible a mark on a spectacle lens, wherein an illumination light beam is directed to the spectacle lens, which runs through the spectacle lens and, after having run through the spectacle lens, is reflected on a reflector configured as a retroreflector, then runs again through the spectacle lens, and is finally fed to a camera as an observation light beam.

Further, the invention, further, is related to a method for measurement of a physical property of a spectacle lens provided with a mark, wherein a measurement light beam is directed to the spectacle lens and fed to a sensor, wherein, further, for making visible the mark, an illumination light beam is directed to the spectacle lens, which runs through the spectacle lens and, after having run through the spectacle lens, is reflected on a reflector, then runs again through the spectacle lens, and is finally fed to a camera as an observation light beam.

Moreover, the invention is related to an apparatus for making visible a mark on a spectacle lens comprising:

an illumination light source arranged on a first side of the spectacle lens for generating an illumination light beam, for identifying the mark;

a reflector arranged on the side of the spectacle lens opposite the first side, and being configured as a retroreflector;

a camera for receiving an observation light beam coming from the spectacle lens;

first optical means for guiding the illumination light beam through the spectacle lens; and second optical means for guiding the observation light beam reflected by the reflector through the spectacle lens to the camera.

Still further, the invention is related to an apparatus for measuring a physical property of a spectacle lens provided with a mark, comprising:

an illumination light source arranged on a first side of the spectacle lens for generating an illumination light beam, for identifying the mark;

a reflector arranged on the side of the spectacle lens opposite the first side;

a camera for receiving an observation light beam coming from the spectacle lens;

first optical means for guiding the illumination light beam through the spectacle lens; and second optical means for guiding the observation light beam reflected by the reflector through the spectacle lens to the camera, a measurement light source for generating a measurement light beam for a measurement of a physical property of the spectacle lens;

a sensor; and third optical means for guiding the measurement light beam from the measurement light source to the spectacle lens, and from the spectacle lens to the sensor.

Finally, the invention is related to an apparatus for making visible a spectacle lens provided with a mark.

BACKROUND OF THE INVENTION

Spectacle lenses, in particular so-called progressive spectacle lenses, are provided with marks, the position of which being detected during the manufacture of the spectacle lens, and being processed, in order to chuck the spectacle lens in a correct position, to work it, to stamp it, and, finally, to bring it into the spectacle frame of the end user. Marks are applied to spectacle lenses in a durable manner, i.e. by diamond scratching methods, or during the forming when plastic material spectacle lenses are molded, or by laser marking. Moreover, the term "mark" as used in the context of the present invention, also comprises other irregularities of the spectacle lens, for example streaks within the glass or the plastic material.

If, in the context of the present application, "spectacle lenses" are referred to, it is to be understood that this term also comprises contact lenses or other comparable optical elements.

In order to avoid that the user of the spectacle is irritated by the marks when the spectacle is used, the marks are configured such that they are visible only under very special light circumstances. The detection of the position of a mark on a spectacle lens during the production process is, therefore, quite difficult. An additional problem is that the spectacle lenses in a production process have very different optical effects due to the specific requirements of the later user of the spectacle. Therefore, within a production line spectacle lenses of highly different optical effects are following one after the other so that these optical effects have to be taken into account in a fast sequence during the subsequent working of individual spectacle lenses.

The recognition of a mark on a spectacle lens is particularly difficult, when the spectacle lens is provided with a phototropic coating. Such spectacle lenses are commonly referred to in the art as HIP (High Index Phototropic) lenses. Phototropic coatings of the type of interest in the present context are relatively thick. The coating thickness is about 30 μm, whereas other lens coatings (antireflex coatings etc.) have a thickness of only about 2-3 μm. The marks are applied to the lens body prior to the coating. Therefore, they are covered by the coating that is applied later. Whereas this does not present a real problem for conventional thin coatings for what concerns the recognition of marks, a problem arises when the mark is covered by a thick phototropic coating. The marks become optically smeared thereby, i.e. the edges of the mark become blurred. In contrast to the situation with thin coatings only a low frequency phenomenon appears.

For a control of progressive lenses both in the far and in the near design reference point, it is necessary to measure the effect of the progressive lenses at predetermined coordinate points on the spectacle lens depending on the applied marks. For a manual or for an automatic measurement these marks must, therefore, be made visible. According to prior art methods and apparatuses, this is done by means of rhombic gratings or strip patterns which are imaged blurred, wherein the edge transitions bright/dark make the mark visible.

A disadvantage of this prior art approach, in particular during the automatic recognition of a mark, is that the grating is imaged differently, depending on the optical effect of the particular spectacle lens under investigation, namely as a function of the particular dioptric effect of the spectacle lens. It is, therefore, necessary to make considerable efforts for the recognition of marks with respect to the algorithms used. Prior art methods, therefore, have not yet matured into a complete, safe and automatic recognition. Under actual practice it is, therefore, necessary that even with automatic control devices a person of particular trained skill has to manually interfere into the production process for correcting wrong recognitions.

But also in a situation where the marks are recognized within a production process by means of a manual examination action, the situation is quite similar. In that case different illuminations are used depending on the particularly used marking process in order to make the marks visible. According to prior art apparatuses this is affected by manually interchanging illumination units. However, also with these manual methods the marks are quite obscure and difficult to recognize so that errors are possible during the positioning and the orienting of the particular spectacle lens. This holds true in particular with regard to the amount of time being available for recognizing the mark. For these reasons, it is necessary, in particular for plastic material spectacle lenses, to additionally mark the spectacle lenses prior to the recognition of the marks as such, namely by means of a felt pen or the like (so-called "pointing") which results in additional work and time consumption.

Corresponding considerations also apply for other areas within the processing of such spectacle lenses, namely for stamping automats, which, according to the actual state of the art likewise require the assistance of an operating person. The person observes the spectacle lenses on a screen in order to manually correct within the system positions of the marks that have not been properly recognized automatically. This is, for example, effected by means of roller sphere input. This disadvantage likewise results in a reduction in productivity of a video-assisted, manually operated stamping machine.

Document U.S. Pat. No. 3,892,494 discloses a method and an apparatus for locating optical microeffects on optical components, for example lenses. A laser beam is directed on the component under investigation via a beam splitter, namely a semi-transparent mirror. The laser beam runs through the component and impinges on the other side thereof on a retroreflector, for example a retroreflecting foil from which it is again reflected back through the component and then runs back on the same ray path until it is deflected by the beam splitter directed to a camera.

A disadvantage of this prior approach is that it may result in problems for spectacle lenses of highly different curvature. Due to the highly different curvature the observation ray path must be long and stopped down in order to achieve a sufficient depth of field. On the other hand, the structures of the retroreflector shall not be imaged sharply because for avoiding wrong interpretations it is desired to have a relatively homogeneous background. As a consequence, the retroreflector in these applications must be located very far behind the plane of the spectacle lens to be measured and, further, it should be configured very large, because strongly negative spectacle lenses would image the retroreflector on a very small scale so that the entire lens could no more be seen over the retroreflector.

In addition, it is important in the context of the present invention that not only the recognition of marks or of other irregularities on spectacle lenses is concerned, but moreover the integration of this recognition process into a measuring instrument or into a working process. In such instances, however, a sensor is arranged behind a spectacle lens, i.e. on the same side as the retroreflector of the prior art apparatus, for measuring physical properties of the spectacle lens. For design reasons it is, therefore, impossible to locate the retroreflector far behind the plane of the spectacle lens.

Document U.S. Pat. No. 4,310,242 discloses an apparatus for measuring the optical qualities of windshields in situ. For that purpose an optical apparatus is also used here having a light source, a beam splitter, a retroreflector positioned behind the windshield to be measured, as well as a camera. A fine pattern is projected through the beam splitter on a retroreflecting screen, such that a real image of this pattern is generated on the retroreflecting screen being deformed by the windshield positioned within the ray path. Via the beam splitter the camera also looks in the direction of projection through the windshield under investigation on the retroreflective screen. Inhomogeneities, tension double refractions, streaks and the like are clearly made visible in such a way.

Document DE 43 43 345 A1 disclosed methods and apparatuses for measuring the reflective and the transmissive, respectively, optical properties of a sample. A measuring radiation is directed on a sample and is reflected by the sample so that it impinges on a retroreflector which, again, sends the measuring radiation back via the object to the light source where a decoupling a detector takes place.

Another similar approach is also described in document EP 0 169 444 A2.

In a prior art vertex refractometer "Focovision SG1" a light beam is emitted from a light source through a green filter and is directed on a spectacle lens to be examined via a beam splitter. The light beam runs through the spectacle lens and impinges on a sensor head located behind the rear side of the spectacle lens. In such a way physical properties of the spectacle lens may be measured. Moreover, on the rear side there is a plane in which exchangeable illumination accessories may be located. These illumination accessories illuminate the spectacle lens from the rear such that the marks become visible. A corresponding observation light beam runs from the spectacle lens to the beam splitter, is there reflected and then fed to a camera via other optical means. In a first illumination accessory a sharply limited bright light bundle is directed on the spectacle lens under a flat angle. Marks that have been applied by scratching will then appear bright due to the irregular shape of the scratch in front of a dark background. A second illumination accessory, in contrast, is provided for spectacle lenses in which the marks have not been applied by scratching but by forming or by laser beams instead. This second illumination accessory therefore, comprises a bright line grating being illuminated from below, as well as a plurality of auxiliary lenses arranged one besides the other by means of which these bright gratings may be imaged to infinity.

This prior art apparatus, therefore, is relatively difficult to operate. Further, the point in which the measuring beam emitted by the light source impinges on the spectacle lens coincides with the point in which the observation light beam exits from the spectacle lens. This may result in errors during the processing.

DE 197 40 391 discloses still another observation apparatus for masked markings, i.e. marks. In this apparatus, a lens, being provided with a masked marking, is illuminated with an illumination light. The masked marking is then observed as a shadow of the lens generated by the observation light.

In this apparatus we have the disadvantage that the marking will be shifted depending on the type of the lens and its local prismatic effect or is reduced in size or amplified, respectively, by the positive or by the negative effect of the lens.

SUMMARY OF THE INVENTION

It is, therefore, an object underlying the invention to provide methods and apparatuses of the type specified at the outset such that the afore-mentioned disadvantages are avoided. In particular, it shall become possible to treat spectacle lenses during a production process in that on the one hand side the marks applied thereto are recognized in their correct position, on the other hand side also a measurement of the spectacle lens within the same process and within the same apparatus becomes possible. All this shall be accomplished with apparatus and method means being as simple as possible.

It is another object of the invention to provide an apparatus which allows the recognition of marks also below relatively thick coatings, in particular phototropic coatings, and to handle such spectacle lenses in an industrial manufacturing process.

According to the method specified first at the outset, this object is achieved by the present invention in that the reflector is moved.

According to the method specified second at the outset, this object is achieved by the present invention in that the measurement light beam is generated by a first light source and the illumination light beam is generated by a second light source, the light sources being physically distinct units.

According to the apparatus specified first at the outset, this object is achieved by the present invention in that the reflector is connected to a drive motor for moving the reflector.

According to the apparatus specified second at the outset, this object is, finally, achieved by the present invention in that the measurement light source and the illumination light source as well as the first optical means and the third optical means are each physically distinct units.

According to the apparatus mentioned third at the outset, this object is achieved by the present invention in that the apparatus comprises a support with the spectacle lens resting thereon, the spectacle lens being provided with a phototropic coating, the mark being applied to the spectacle lens below the phototropic coating, an illumination light source for generating an illumination light beam, the illumination light source being configured as a point light source, a camera for receiving an observation light beam, first optical means for guiding the illumination light beam from the illumination light source to the spectacle lens, and through the spectacle lens and the mark, and second optical means for guiding the illumination light beam after having run through the spectacle lens as an observation light beam to the camera.

The object underlying the invention is thus entirely solved.

If, namely, the reflector being configured as a retroreflector, is moved, a more homogeneous background is generated, as compared to the prior art. The marks distinguish from this more homogeneous background significantly clearer, and, therefore, with more contrast. The spectacle lenses to be examined appear constantly bright during the measurement. At the edges of the marks, however, such a strong scattering takes place, that the scattered light does no more fulfill the condition of the retroreflection, with the consequence that the marks appear dark in front of a bright background. By moving the retroreflector, the structure thereof becomes blurred and waves, inhomogeneities, soiling, etc. of the retroreflector become no more apparent.

The measure to use physically distinct components for the ray path of the measurement light and of the observation light and, at least partially, to also use distinct ray paths, has the effect that the measurement of physical properties of the spectacle lens and the recognition of marks on the spectacle lens may be clearly separated one from the other methodwise.

The use of a point light source (so-called "artificial star") has the advantage that low frequency phenomena become apparent. The recognized image of the mark, therefore, becomes sharper at its edges.

In a preferred embodiment of the invention the inventive method with the moved retroreflector may be combined with a vertex refractometer so that the measurement may easily be effected at those points on the spectacle lens, the position of which relative to the mark being defined on the spectacle lens. For that purpose, the inventive method is combined with the vertex refractometer such that an image of the mark must assume a certain position on a camera image during the making of the measurement. For that purpose one uses an illumination ray path and a measurement ray path which may be optically decoupled as described in detail, although they partially use identical paths.

If in the context of the present application the term "retroreflector" is used, this is to be understood to mean an area which reflects incoming light over a large range of incident angles essentially into the same direction in which it has come in. In practice, one uses plane or curved surfaces being provided with a retroreflective surface, for example with glass pearls or on which many small triple mirrors or mirrored triple prisms are applied in a regular arrangement. Such surfaces are generally known from back reflectors on vehicles, traffic signs, light barriers, etc. For the inventive method it is advantageous when the individual retroreflective structures on the retroreflector are essentially smaller than 1 mm.

In preferred embodiments of the inventive method, the reflector is moved essentially periodically, in particular in rotation. As an alternative, a movement in a parallel rotational translation may also be considered, in which the retroreflector is, for example, displaced within a plane and its center is moved on a circular path without rotating the retroreflector as such. Besides that any linear movement of the retroreflector is possible.

All these movements are essentially effected transversely with regard to the direction of propagation of the illumination light beam.

When the retroreflector is moved periodically, another preferred embodiment of the invention consists in adapting the frequency of the periodic movement of the reflector to a synchronizing signal of the camera. In particular, it is preferred when the frequency is revolution-synchronized, in particular phase-synchronized with the synchronizing signal.

This measure has the advantage that the electronic processing of the video signals derived from the observation light beam becomes particularly simple.

In another group of embodiments a good effect is achieved when the reflector is moved at a distance of between 1 cm and 30 cm from the spectacle lens.

This measure has the advantage that a particularly homogeneous background of the moved retroreflector is achieved.

A particularly good effect is, further, achieved when a video signal generated from the observation light beam within the camera is emphasized in contrast over neighborhoods being each finite, by means of at least one folding generation. Preferably, when doing so, high spatial frequencies are emphasized more than low spatial frequencies, for example due to a differentiating effect.

The video signal generated from the observation light beam within the camera may be used for various purposes according to the invention. On the one hand it may be used for identifying the mark by means of pattern recognition. On the other hand it may be used for identifying a position of the spectacle lens on a support, and finally for identifying a dioptric effect of the spectacle lens.

According to the invention, various ray paths may be combined entirely of over certain lengths, in order to be able to execute the method within a space being as small as possible.

According to a first variant, the illumination light beam is coupled into the ray path of the observation light beam. According to a second variant, the measurement light beam is coupled into the ray path of the observation light beam. In a third variant, finally, the measurement light beam is coupled into the ray path of the illumination light beam.

According to embodiments of the inventive apparatus, this is preferably effected by corresponding beam splitters or by other appropriate optical means, for example through-bored mirrors.

In connection with the beam splitters used, it is preferred to provide a light trap for a portion of the illumination light beam running through the beam splitter.

If a beam splitter is provided for coupling the illumination light beam into the ray path of the observation light beam, this is preferably effected such that an entrance pupil of the camera and an exit pupil of the illumination light source are arranged at conjugate positions with regard to the beam splitter.

According to the invention, it is, further, preferred when the illumination light beam is blanked out at least in the point of impingement of the measurement light beam on the spectacle lens.

This measure has the advantage that interactions are avoided that might occur because the illumination light beam impinges on the sensor that should only receive the measurement light beam.

In so far it is particularly preferred when the illumination light beam is generated as a light beam an annular-shaped cross section.

Under apparatus aspects this is effected in that either the illumination light source generates an illumination light beam having an annular-shaped cross section or in that the illumination light source comprises a slide having an opaque spot in the ray path of the illumination light beam.

In further preferred embodiments of the invention the illumination light beam and the measurement light beam are generated with a different wave length.

This measure, too, has the advantage that both light beams may be exactly separated one from the other with regard to their electronic processing.

Preferably, the illumination light beam is generated as a red light and the measurement light beam is generated as a green light.

Moreover, it is preferably possible to guide the measurement light beam impinging on the sensor through a filter acting as a stop filter for the light wave length of the illumination light beam.

This measure too, helps to separate the two ray paths one from the other.

Moreover, the retroreflector may be configured plane or domed.

In a preferred embodiment of the invention the point light source has an aperture ratio of less than 1/200, preferably of less than 1/500 relative to the mark.

This measure has the advantage that an optimum compromise between an ideal point light source and a practical point light source can be found. When a point light source with an aperture ratio of 1/500 is used, a high power light emitting diode with a selection aperture stop may be used having a diameter of 1 mm and a distance of 500 mm to the spectacle lens surface provided with the mark.

Moreover, it is preferred when the point light source has a wave-length in the transition between visible and invisible light, preferably of less than 400 nm or of more than 750 nm.

This measure has the advantage that stray light and ambient light may well be suppressed by receiver-sided filters.

Further advantages will become apparent from the description and the enclosed drawing.

It goes without saying that the features mentioned before and those that will be explained hereinafter, may not only be used in the particularly given combination, but also in other combinations, or alone, without leaving the scope of the present invention.

BRIEF DESCRIPTION OF THE DRAWINGS

Embodiments of the invention are shown in the drawing and will be explained in further detail throughout the subsequent description.

DETAILED DESCRIPTION OF THE PREFERRED EMBODIMENTS

Figure 1:
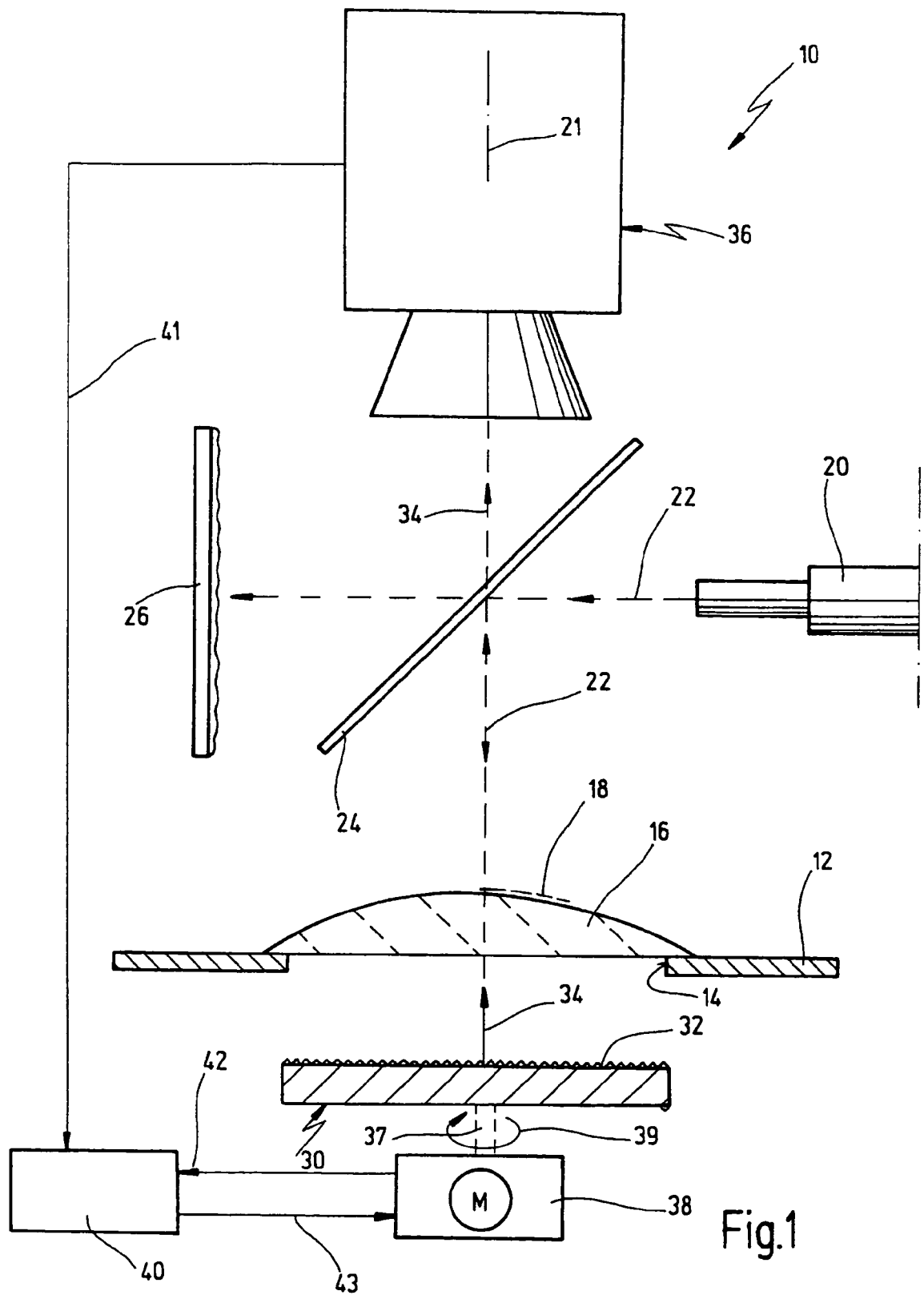
FIG. 1 shows a highly schematic side elevational view of a first embodiment of an inventive apparatus.

In FIG. 1 reference numeral 10 as a whole designates a first embodiment of an apparatus according to the present invention. Apparatus 10 comprises a support 12 having a central opening 14. A spectacle lens 16 is disposed on support 12 over opening 14.

As one can see from the enlarged section in FIG. 1, spectacle lens 16 is provided with a mark indicated at 18. Mark 18 is applied into the surface of spectacle lens 16. In the embodiment shown, spectacle lens 16, further, is provided with a thick coating, in particular with a phototropic coating, covering mark 18. The thickness of the coating is about 30 μm. The invention, however, is not limited to spectacle lenses having such thick coatings.

An illumination light source 20 is directed preferably transversely with regard to the optical axis of spectacle lens 16 which, in the embodiment shown, coincides with the optical axis 21 of a camera 36. In particular if spectacle lens 16 is provided with thick coating 19, illumination light source may preferably be a point light source. It has an aperture ratio of less than 1/200, preferably of less than 1/500 relative to the upper surface of spectacle lens 16. If illumination light source 20 is configured by a high power light emitting diode (for example Type SFH4230 of the Osram company) with a selection aperture stop in front thereof, the diameter of the aperture stop may be 1 mm and the distance from the aperture stop to the surface of the spectacle lens 16 provided with mark 18 may be 16,500 mm if the aperture ratio is 1/500.

Illumination light source 20 is preferably operated at a light wave length being outside or at the transition between visible and invisible light, i.e. for example below 400 nm or above 750 nm.

Illumination light source 20 emits an illumination light beam 22. Illumination light beam 22 impinges on a beam splitter 24, for example a semi-permeable mirror, and is reflected therefrom in the direction of optical axis 21 of camera 36. That portion of illumination light beam 22 emanating from illumination light source 20 and running through beam splitter 24 is absorbed by a light trap 26 located behind beam splitter 24.

Illumination light beam 22 runs through spectacle lens 16 where-from it impinges on a retroreflector 30, which, in the illustration of FIG. 1, is positioned below spectacle lens 16. Retroreflector 30 is provided with a retroreflecting coating 32. It may be configured as a conventional retroreflecting foil or as a retroreflector having regularly arranged triple mirrors or mirrored triple prisms.

Illumination light beam 22 reflected from retroreflector 30 now again runs through spectacle lens 16, in the opposite direction, and is then fed as an observation light beam 34 to camera 36, for example a CCD-camera. Camera 36 is focused on spectacle lens 16 and generates an image of spectacle lens 16 in which mark 18 is visible in front of the background of retroreflector 30.

In the embodiment shown, a drive shaft is connected to a drive motor 38 via a highly schematically indicated actuating connection 37. Drive motor 38 rotates retroreflector 30 about a vertical axis being preferably flush with axis 21 of camera 36 as well as with the axis of illumination light beam 22. In FIG. 1 this is indicated by an arrow 39.

In the embodiment shown in FIG. 1 the retroreflecting coating 32 is made continuous in the area of vertical rotational axis of retroreflector 30. Due to that a pattern may remain recognizable in the area of the rotational axis and within a small circular neighborhood thereabout and under unfavorable circumstances which, however, disturbs only little in practice. It should be emphasized already at this instance that retroreflector 30 for that reason may be configured annular-shaped, as is the case, for example, in the embodiment of FIG. 2 discussed below.

Instead of rotating retroreflector 30 as a whole about a vertical axis, one may also let it oscillate linearly and transversely with regard to axis 21. If in that case, retroreflectors are used having a continuous pattern of the retroreflecting elements, care must be taken that an appropriate direction of the linear oscillating movement of the pattern is set.

Figure 6:
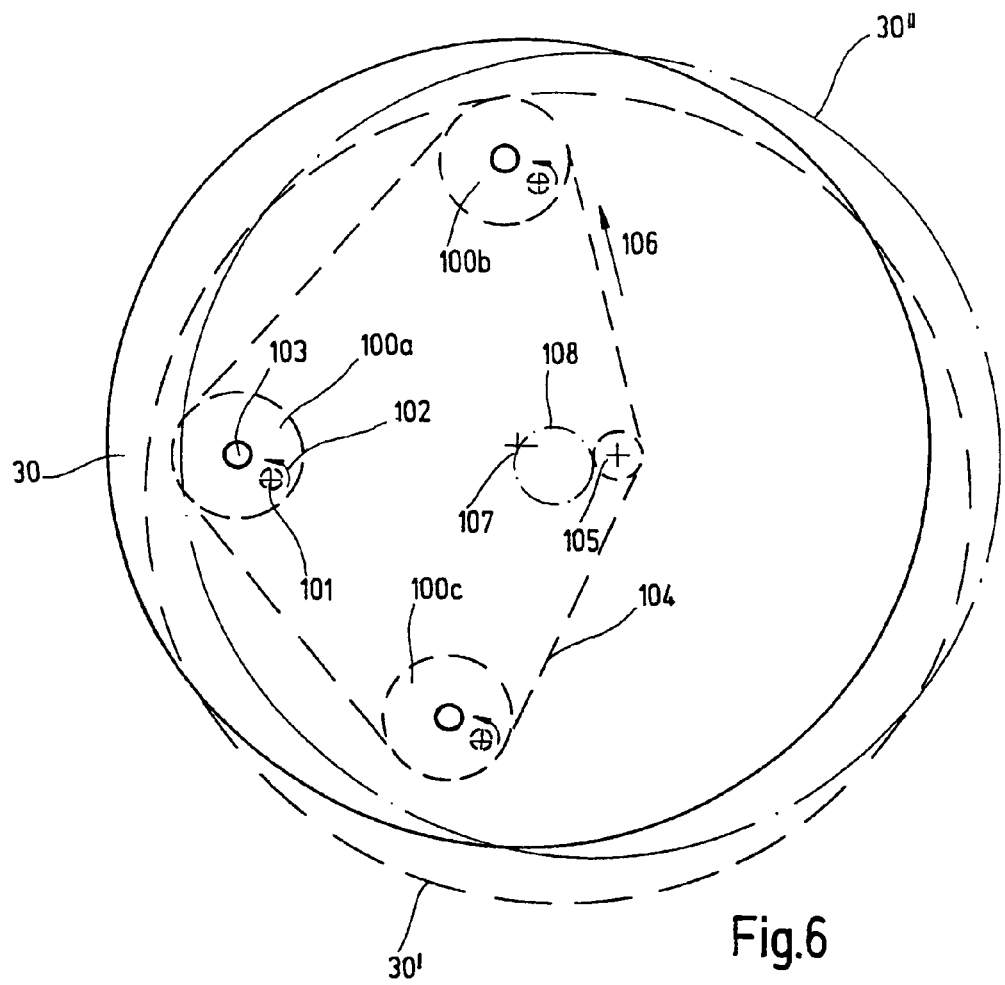
FIG. 6 on an enlarged scale shows a top plan view on a retroreflector as may be used in the apparatus of FIG. 1, however, with a drive for a parallel rotational transformation.

Finally, in still another variant it is also possible to move retroreflector 30 in a parallel rotational translation, similar to the oscillating movement of a grinding plate of a hand-held oscillating grinding machine. A corresponding drive mechanism for that purpose is shown in FIG. 6 and will be discussed in further detail below.

Seen as a whole it is important for the movement of retroreflector 30 that the regular structure of retroreflector 30 and, as the case may be, a dirt or soiling sticking thereto, become blurred with the movement. Is has already been mentioned that the main component of movement of retroreflector 30 should extend essentially transversely to optical axis 21 of camera 36.

For the retroreflecting coating 32 of retroreflector 30 one preferably uses a continuous pattern of individual elements, for example regularly arranged triple prisms or triple mirrors. In that case it makes sense to couple the movement of retroreflector 30 with vertical synchronizing pulses of camera 36.

For that purpose a circuitry as shown in FIG. 1 may be used. The circuitry consists of an electronic control unit 40 being connected to camera 36 via a first electrical line 41 and being connected to drive motor 38 via a second electrical line 42. Electronic control unit 40, in turn, delivers control commands to drive motor 38 via a third electrical line 43.

The vertical synchronizing pulses of camera 36 are transmitted to electronic control unit 40 via first line 41. Motor 38 delivers encoder pulses via second electrical line 42, the encoder pulses being compared with the vertical synchronizing pulsed within electronic control unit 40. From that comparison a control signal for current or for the voltage of drive motor 38 is derived and transmitted via third electrical line 43. The control may effect a revolution synchronization, i.e. an adaptation of revolutions of drive motor 38 to the frequency of the vertical synchronizing pulses. However, it is particularly preferred if, moreover, a rigid phase coupling is effected such that a predetermined constant phase relation between the periodic movement of drive motor 38 (for example of its rotational movement) and the vertical synchronizing pulses of camera 36 is ensured.

By utilizing a moved retroreflector 30, the background before which spectacle lens 16 is imaged homogeneously within camera 36. Therefore, one avoids a disadvantage of prior art apparatuses, in which in addition to the mark to be recognized there is still another blurred structure superimposed which may even have the same order of magnitude as the mark to be recognized. If, in contrast, retroreflector 30 is moved as described above, one may subtract a homogeneous background image during the image processing. In prior art apparatuses this is impossible because the inhomogeneous background pattern would be imaged in different sizes depending on the differing curvature of the spectacle lenses.

It is of particular advantage during the observation of the contrasted image to let the video signal of camera 36 additionally run via a contrasting apparatus. The contrasting apparatus, for example, executes a local folding operation on the grey values by utilizing a core function having a differentiating character a plurality of directions. For each pixel P[ij] one computes the sum $$A[i, j] = c * \sum_{ii, jj=1\ldots n} P[i-ii, j-jj] * K[ii, jj]$$

and displays the display values A[i, j] or one processes same further, for example with a pattern recognition. When doing so, n is the core length (e.g. n=3) and c is an appropriate normation factor. An appropriate folding core is, for example:

$$K[ii, jj] = \begin{pmatrix} -1 & 0 & -1 \\ 0 & 4 & 0 \\ -1 & 0 & -1 \end{pmatrix} \text{ or}$$

$$K[ii, jj] = \begin{pmatrix} 0 & -1 & 0 \\ -1 & 4 & -1 \\ 0 & -1 & 0 \end{pmatrix} \text{ or}$$

$$K[ii, jj] = \begin{pmatrix} -1 & -1 & -1 \\ -1 & 8 & -1 \\ -1 & -1 & -1 \end{pmatrix}$$

One may, for example, continuously compute the contrasting function on a universal computer and display the image (being shortened at the rims of the image area by one core length each). It is even simply possible to implement such a contrasting function in hardware, without using a computer, and to display the result in real time on a video screen. For that purpose a video digitizer is required and as many delay lines as the folding core has lines (in the above notation n). Further, a so-called convolver chip is required, as is, for example, commercially available under the denomination PDSP 16488 from the Plessey company.

Figure 2:
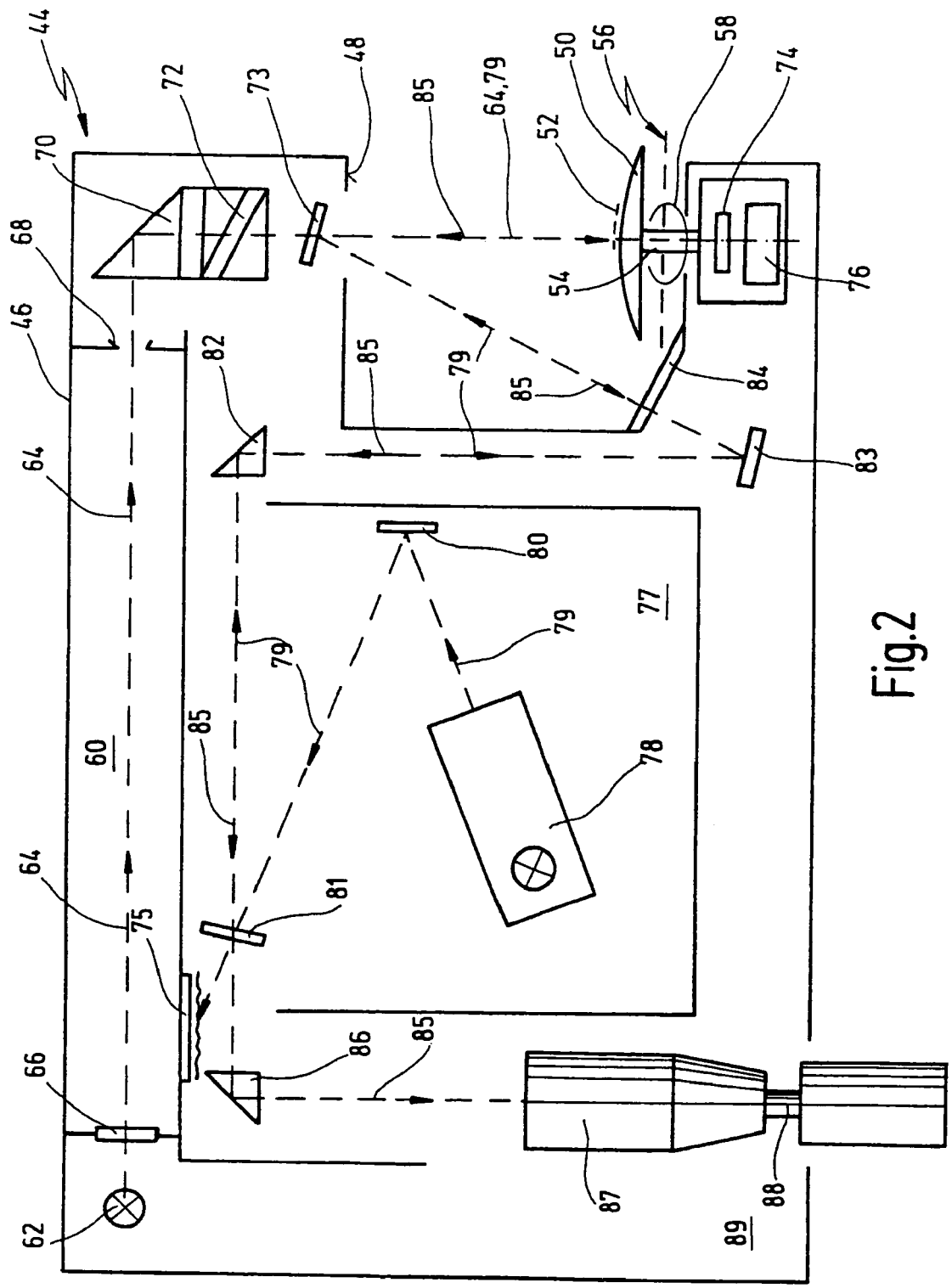
FIG. 2 shows a likewise schematic representation of a second embodiment of an inventive apparatus, namely a vertex refractometer, wherein additional optical means are provided for measuring a spectacle lens.

In the embodiment of FIG. 2, reference numeral 44 designates an apparatus, namely a vertex refractometer having a light tight housing 46.

In FIG. 2 only one mark 52 is shown. In reality, however, two marks are provided being located at a predetermined distance above and below, respectively, the plane of the drawing. The position of these two marks define the location of a spectacle lens at which a physical property, for example the optical power of spectacle lens 50, shall be measured. Spectacle lens 50 corresponds to spectacle lens 16 of FIG. 1, i.e. it may be likewise provided with a thick, phototropic coating (not shown in FIG. 2).

A measurement light beam 64 is directed on this location. For that purpose spectacle lens 50 is laid down on a tubular support 54 by an operator and is there manually adjusted relative to the marks 52. Insofar, the apparatus may be a conventional vertex refractometer. On this vertex refractometer spectacle lens 50 is positioned during the measurement such that marks 52 being displayed in a contrasted fashion, come to lie at a predetermined position within the camera image. Marks 52, therefore, are not at the location of measurement as such at a predetermined geometric relation thereto.

Only on its right-hand side in FIG. 2 housing 46 has an opening 48 being accessible from the exterior. Within opening 48 there is a support for spectacle frame 50 being provided with mark 52.

Below spectacle lens 50 there is an annular-shaped retroreflector 56 which is only shown merely schematically. Retroreflector 56 is adapted to be rotated by means of an appropriate drive (not shown) as indicated with an arrow 58. Insofar the same applies as was already explained above with regard to the embodiment of FIG. 6.

In housing 46 there is an upper chamber 60 being equipped with a measurement light source 62 at the left-hand end thereof. Measurement light source 62 emits a measurement light beam 64. Measurement light beam 64 first runs through a first color filter 66 and then through an aperture stop 68 before it is deflected downwardly at a prism 70 or a corresponding mirror. Measurement light beam 64 then runs through a prisms compensator 72 as well as through a hole in a through-bored mirror 73 and then impinges on the surface of spectacle lens 50. It then runs through spectacle lens 50 as well as through support 54 and, in another preferred embodiment of the invention, runs through a second color filter 74 before it impinges on a sensor 76.

Within a central chamber 77 of housing 46 there is an illumination light source 78, three embodiments of which being discussed below in connection with the FIGS. 3 through 5.

Illumination light source 78 may likewise be a point light source, in particular when spectacle lens 16 is covered by a thick phototropic layer, as discussed above.

Illumination light source 78 emits an illumination light beam 79. Illumination light beam 79 first impinges on a deviation mirror 80 and then on a semipermeable mirror acting as a beam splitter 81. That portion of illumination light beam 79 running through beam splitter 81 is absorbed within a light trap 75 being positioned behind beam splitter 81. Illumination light beam 79 is essentially deviated to the right-hand side by beam splitter 81 for then impinging on a prism 82 or a mirror, deviating illumination light beam 79 downwardly. After still another deviation by a deviation mirror 83 illumination light beam 79 runs through a window 84 of opening 48 and impinges on through-bored mirror 73 which deviates illumination light beam 79 again upwardly where it impinges on spectacle lens 50 and illuminates mark 52.

Illumination light beam 79 being reflected from spectacle lens 50 and from mark 52, respectively, now configures an observation light beam 85 which, first, runs upwardly and then via through-bored mirror 73, deviation mirror 83, prism 82 and beam splitter 81 on another prism 86 or a corresponding mirror which deviates observation light beam 85 downwardly where it is fed to a CCD-camera 88 via a lens 87. Prism 86, lens 87 and CCD-camera 88, positioned within a left chamber 89 of housing 46.

The entrance pupil of lens 87 and the exit pupil of illumination light source 78 are located at conjugate positions with regard to beam splitter 81.

The apparatus 44 of FIG. 2 operates as follows:

Within a measurement branch, measurement light beam 64 is emitted in the fashion described above from measurement light source 62 to spectacle lens 50, runs there through and impinges on sensor 76. In such a way physical properties of spectacle lens 50 may be measured. For a better distinction from illumination light beam 79 and from observation light beam 85, respectively, measurement light beam 64 is emitted in another light wavelength, for example as green light. For that purpose, first color filter 66 is configured as a green filter. Second color filter 74 in front of sensor 76, in contrast, has the function of a band stop filter which does not let other light wavelengths pass, in particular those of illumination light beam 78. In such a way it is avoided that other light except from measurement light beam 64 impinges on sensor 76.

Concurrently, illumination light beam 79 from illumination light source 78 is directed on spectacle lens 50 in the manner described above, for illuminating mark 52. The reflected image of mark 52 reaches CCD-camera 88 as the observation light beam 85 and, from thereon, is processed as a video signal.

While all that happens, retroreflector 56 below spectacle lens 50 is moved (arrow 58), namely in the already described manner, i.e. about support 54, either rotating or in a parallel rotational translation.

The frequency of the afore-mentioned periodic movement of retroreflector 56 is selected such that it is adapted to the reading frequency of camera 88.

Also insofar, it goes without saying that a further contrasting may be effected by a folding operation of the type discussed above.

As an alternative or in addition to sensor 76 a measurement of a physical parameter of spectacle lens 50 may be made via the evaluation of the video signal of CCD-camera 88.

In general, however, it is desired to decouple the measuring branch on the one hand and the illumination /observation branch on the other hand.

Figure 3:
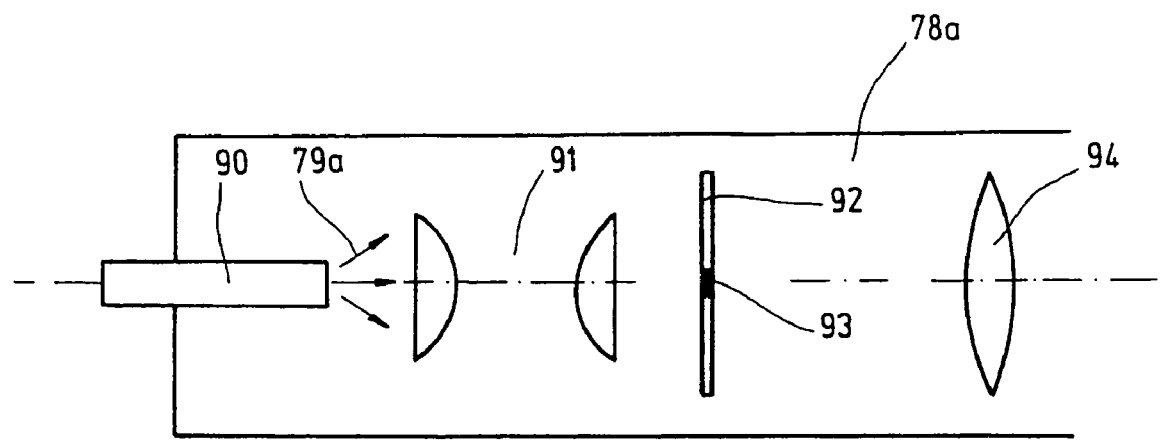
FIGS. 3-5 show three distinct embodiments of illumination light sources as may be used in the embodiments according to FIGS. 1 and 2.
Figure 4:
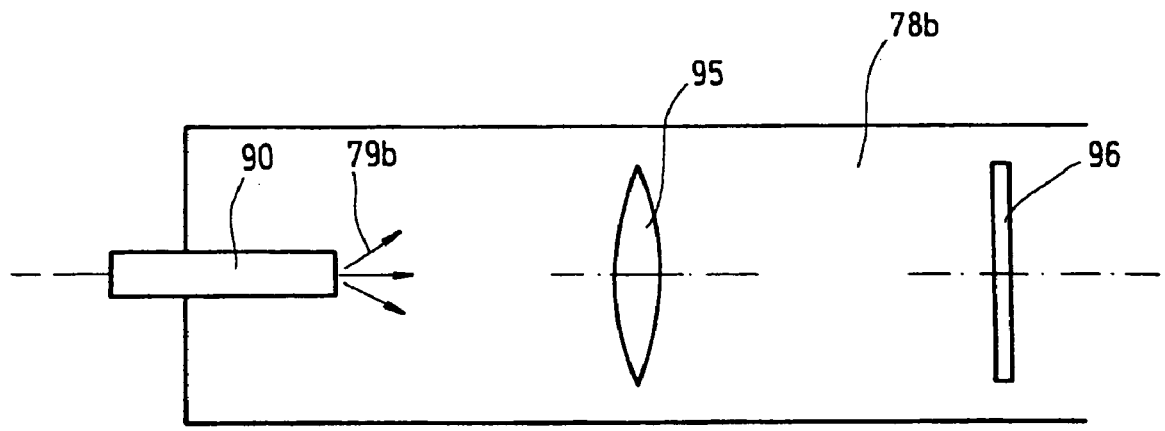
Figure 5:
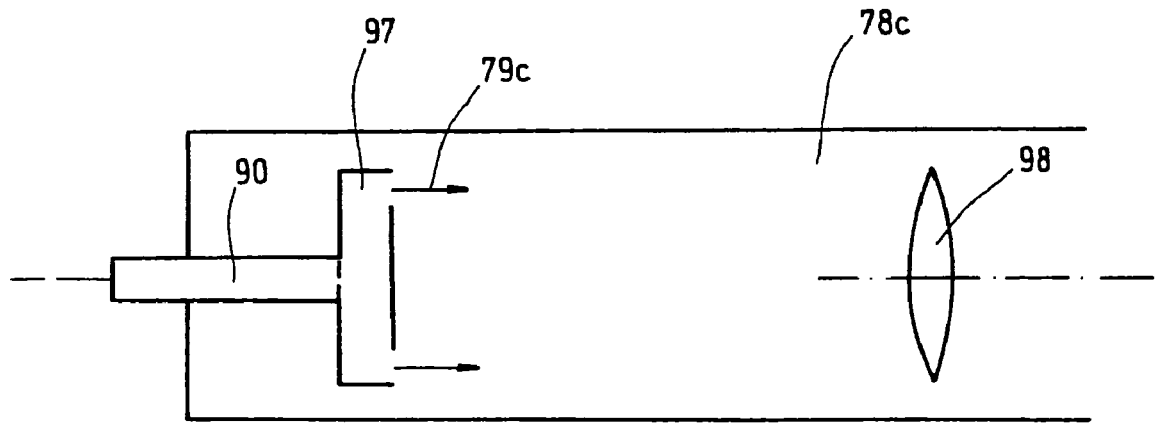

For that purpose, illumination light source 78 is preferably configured as shown in three embodiments in FIGS. 3 through 5.

It is a common feature of all three embodiments of FIGS. 3 through 5 that light is fed thereto via a light guide 90. Of course, this does not exclude that the light may also be generated within illumination light source 78 itself, for example by means of a laser, a laser diode, a light emitting diode or the like.

In the embodiment of FIG. 3 light guide 90 within illumination light source 78a emits illumination light beam 79a which, at this instance, is a diverging light beam. By means of a downstream collimating optical unit 91 illumination light beam 79a is made parallel and then impinges on a transparent slide 92 which is provided with a central black spot 93 in the area of the optical axis. By means of an imaging optical unit 94 illumination light beam 79a is now directed on deviation mirror 80 (FIG. 2).

By imaging the central black spot 93 on the surface of spectacle lens 50 it is ensured that no illumination light will enter into the opening of tubular support 54 used for the optical measurement. This is exactly the area in which measurement light beam 64 impinges on spectacle lens 50. By doing so one prevents that illumination light impinges on sensor 76 via spectacle lens 50.

As has already been mentioned, second color filter 74 may be arranged in front of sensor 76, wherein second color filter 74 acts as a band stop filter for the light wavelength of the illumination light. If, for example, the measurement light is green light, the illumination light may preferably be red light.

In the second embodiment of FIG. 4 illumination light source 78b has likewise a collimating optical unit 95 behind the exit of light guide 90 acting on diverging illumination light beam 79b. In this instance a color filter 96 is arranged in front of collimating optical unit 95 which, in the manner described before, may be a red filter.

In the third embodiment of FIG. 5, finally, a annular-shaped outlet 97 is provided within illumination light source 78c at the free end of light guide 90, for generating an illumination light beam 79c having an annular-shaped cross section. Illumination light beam 79c is directed on deviation mirror 80 via an imaging optical unit 98.

In this embodiment, too, very much like in the embodiment of FIG. 3, a central, stopped-down area is generated, in which no illumination light impinges on the surface of spectacle lens 50, and in which the measurement light may be fed to sensor 76 via spectacle lens 50.

FIG. 6 illustrates the generation of a parallel rotational translation, for example of retroreflector 30. For that purpose there are, for example, three cams 100a, 100b and 100c located below retroreflector 30. Cams 100a, 100b and 100c are each journalled stationary for rotation about a first axis 101, as indicated by an arrow 102.

At equal distances from axis 101, cams 100a, 100b and 100c are journalled with a second axis 103 at retroreflector 30, wherein axes 101 and 103 extend parallel. If cams 100a, 100b and 100c are driven at equal phase (arrow 106), for example by means of a circumferential drive belt 104 and a common drive shaft 105 or a common friction wheel, retroreflector 30 is caused to make a tumbling movement, as indicated at 30' and 30".

According to this tumbling movement the center 107 of retroreflector 30 runs on a circular path 108, the radius of which being equal to the eccentricity, i.e. equal to the distance between the axes 101 and 103. Accordingly, any point on the surface of retroreflector 30 likewise moves along such a circular path.

For compensating unbalanced masses, cams 100a, 100b and 100c may be provided with balancing masses. The amount of excentricity depends on the periodicity of the movement of retroreflector 30 in the first place.

It goes without saying that the drive illustrated in FIG. 6 is only understood to be an example and that, for example, another number of cams may be used. It is likewise possible to use other types of drive, as are, for example, conventional oscillating grinding machines.

Figure 7:
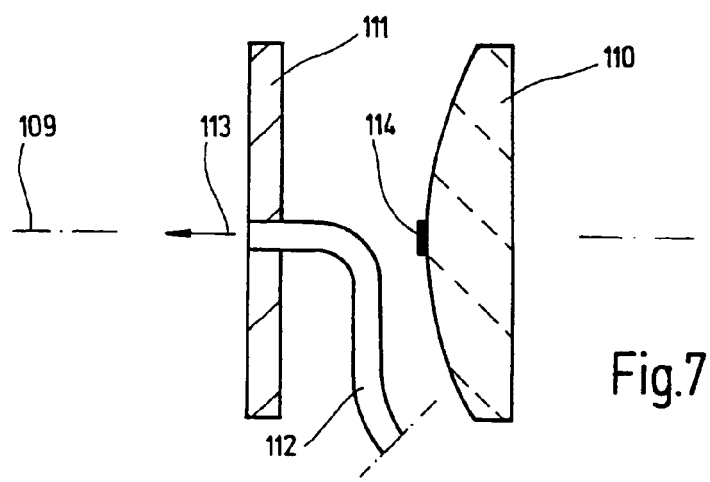
FIG. 7 is a schematic side elevational view for explaining another possibility for coupling illumination light.

FIG. 7, finally, shows still another variant in which no beam splitter (24 in FIG. 1 and 81 in FIG. 2, respectively) is used.

For that, purpose the illumination source is centrally arranged in front of the camera lens. In the embodiment shown the plane parallel glass plate 111 is arranged in front of camera lens 110 in a direction transverse with regard to axis 109. Glass plate 111 carries the end of an optical fiber 112 at its center. Optical fiber 112 emits the illumination light beam 113. In order to avoid that light is directly reflected into the camera, a small area 114 on camera lens 110 is blackened.

The invention claimed is:

1. A method for making visible a mark on a spectacle lens, wherein an illumination light beam is directed to illuminate substantially the entire lens surface of said spectacle lens, said illumination light beam running through said spectacle lens and, directly after having run through said spectacle lens, is reflected on an area of a reflector which reflects incoming light over a large range of incident angles essentially into the same direction in which it has come in, then directly runs again through said spectacle lens, and is finally fed to an image generating camera as an observation light beam, wherein, further, said reflector is moved essentially transversely with regard to the direction of said illumination light beam.

2. The method of claim 1, wherein, further, for measuring a physical property of said spectacle lens a measurement light beam is directed to said spectacle lens and is then fed to a sensor, said measurement light beam being generated by a first light source, and said illumination light beam being generated by a second light source, said first and said second light sources being physically distinct units.

3. A method for measurement a physical property of a spectacle lens provided with a mark, wherein a measurement light beam is directed to said spectacle lens and fed to a sensor, wherein, further, for making visible said mark, an illumination light beam is directed to said spectacle lens, said illumination light beam running through said spectacle lens and, directly after having run through said spectacle lens, is reflected on an area of a reflector which reflects incoming light over a large range of incident angles essentially into the same direction in which it has come in, then directly runs again through said spectacle lens, and is finally fed to an image generating camera as an observation light beam, wherein, further, said measurement light beam is generated by a first light source and said illumination light beam is generated by a second light source, said first and said second light sources being physically distinct units.

4. The method of claim 3, wherein said illumination light beam, after having run through said spectacle lens, is reflected on a retroreflector, said retroreflector being moved.

5. The method of claim 4, wherein said reflector is moved essentially transversely with regard to said direction of propagation of said illumination light beam.

6. The method of claim 1, wherein said reflector is moved essentially periodically.

7. The method of claim 6, wherein said reflector is moved in rotation.

8. The method of claim 6, wherein said reflector is moved in a parallel rotational translation.

9. The method of claim 1, wherein said reflector is moved essentially linearly.

10. The method of claim 6, wherein said frequency of said periodic movement of said reflector is adapted to a synchronizing signal of said camera.

11. The method of claim 10, wherein said frequency is revolution-synchronized with said synchronizing signal.

12. The method of claim 11, wherein said frequency is phase-synchronized with said synchronizing signal.

13. The method of claim 1, wherein said reflector is moved at a distance of between 1 cm and 30 cm from said spectacle lens.

14. The method of claims 1, wherein a video signal generated from said observation light beam within said camera is emphasized in contrast over neighbourhoods being each finite, by means of at least one folding operation.

15. The method of claim 14, wherein high spatial frequencies are emphasized more than low spatial frequencies, for example due to a differentiating effect.

16. The method of claim 1, wherein said mark is identified by means of pattern recognition from a video signal generated from said observation light beam within said camera.

17. The method of claim 1, wherein a position of said spectacle lens on a support is identified from a video signal generated from said observation light beam within said camera.

18. The method of claim 1, wherein a dioptric effect is identified from a video signal generated from said observation light beam within said camera.

19. The method of claim 1, wherein said illumination light beam is coupled into said ray path of said observation light beam.

20. The method of claim 2, wherein said measurement light beam is coupled into said ray path of said observation light beam.

21. The method of claim 2, wherein said measurement light beam is coupled into said ray path of said illumination light beam.

22. The method of claim 21, wherein said illumination light beam is blanked out at least in said point of impingement of said measurement light beam on said spectacle lens.

23. The method of claim 22, wherein said observation light beam is generated as a light beam with an annular-shaped cross section.

24. The method of claim 2, wherein said observation light beam and said measurement light beam are generated with a different light wave length.

25. The method of claim 24, wherein said illumination light beam is generated as a red light and said measurement light beam is generated as a green light.

26. The method of claim 24, wherein said measurement light beam impinging on said sensor is guided through a filter acting as a stop filter for said light wave length of said illumination light beam.

27. A method for making visible a mark on a spectacle lens, wherein an illumination light beam from a point light source is directed to illuminate substantially the entire lens surface of said spectacle lens, said illumination light beam running through said spectacle lens and directly after having run through said spectacle lens, is reflected on an area of a reflector which reflects incoming light over a large range of incident angles essentially into the same direction in which it has come in, then directly runs again through said spectacle lens, and is finally fed to an image generating camera as an observation light beam, wherein, further, said reflector is moved essentially transversely with regard to the direction of said illumination light beam.

28. The method of claim 27, wherein said illumination light beam is directed from said point light source directly through an aperture stop.

29. The method of claim 28, wherein said aperture stop has an aperture ratio of less than 1/200.

30. The method of claim 29, wherein said aperture stop has an aperture ratio of less than 1/500.

31. The method of claim 28, wherein said aperture stop has a diameter of approximately 1 mm.

32. The method of claim 28, wherein said aperture stop has a distance of approximately 500 mm from said spectacle lens.

33. The method of claim 28, wherein said aperture stop has an aperture ratio of 1/500 and has a distance of approximately 16.500 mm fro, said spectacle lens.

34. The method of claim 27, wherein said illumination light beam is generated by a light emitting diode (LED).

35. The method of claim 27, wherein said illumination light beam is generated with a wavelength of less than 400 nm.

36. The method of claim 27, wherein said illumination light beam is generated with a wavelength of more than 750 nm.

37. A method for making visible a mark on a spectacle lens, wherein an illumination light beam is directed to said spectacle lens, said illumination light beam running through said spectacle lens and, directly after having run through said spectacle lens, is reflected on an area of a reflector which reflects incoming light over a large range of incident angles essentially into the same direction in which it has come in, then directly runs again through said spectacle lens, and is finally fed to an image generating camera as an observation light beam, wherein said reflector is moved, and further wherein, for measuring a physical property of said spectacle lens a measurement light beam is directed to said spectacle lens and is then fed to a sensor, said measurement light beam being generated by a first light source, and said illumination light beam being generated by a second light source, said first and said second light sources being physically distinct units.

38. The method of claim 37, wherein said observation light beam and said measurement light beam are generated with a different light wave length.

39. The method of claim 38, wherein said illumination light beam is generated as a red light and said measurement light beam is generated as a green light.

40. The method of claim 38, wherein said measurement light beam impinging on said sensor is guided through a filter acting as a stop filter for said light wave length of said illumination light beam.

* * * * *